(12) United States Patent
Mirza et al.

(10) Patent No.: US 10,083,449 B2
(45) Date of Patent: Sep. 25, 2018

(54) COMMON VIEW FOR CUSTOMER SUPPORT

(71) Applicant: Verizon Patent and Licensing Inc., Arlington, VA (US)

(72) Inventors: Momin Mirza, Santa Clara, CA (US); Gilda Majidi, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 633 days.

(21) Appl. No.: 14/741,006

(22) Filed: Jun. 16, 2015

(65) Prior Publication Data

US 2016/0371701 A1 Dec. 22, 2016

(51) Int. Cl.
*G06F 15/16* (2006.01)
*G06Q 30/00* (2012.01)
*H04L 29/06* (2006.01)

(52) U.S. Cl.
CPC ....... *G06Q 30/016* (2013.01); *H04L 65/1089* (2013.01); *H04L 65/4015* (2013.01)

(58) Field of Classification Search
None
See application file for complete search history.

(56) References Cited

U.S. PATENT DOCUMENTS

| | | | | |
|---|---|---|---|---|
| 6,343,313 B1* | 1/2002 | Salesky | ................ | G06F 3/1415 709/203 |
| 2005/0002515 A1* | 1/2005 | Mewhinney | ........ | H04M 3/5158 379/266.08 |
| 2008/0098067 A1* | 4/2008 | O'Sullivan | .......... | G06Q 10/109 709/204 |
| 2009/0157616 A1* | 6/2009 | Barber | ............. | G06F 17/30643 |
| 2014/0075357 A1* | 3/2014 | Flores | ................ | G06Q 10/0639 715/771 |
| 2014/0294171 A1* | 10/2014 | Caracuel | ............ | H04M 3/5232 379/265.11 |
| 2014/0337213 A1* | 11/2014 | Chang | ................... | G07F 19/201 705/43 |
| 2015/0200832 A1* | 7/2015 | Kurniady | ............. | G06Q 10/101 709/224 |

* cited by examiner

*Primary Examiner* — Umar Cheema
*Assistant Examiner* — Gregory P Tolchinsky

(57) ABSTRACT

A network device sends, to a customer device, real-time customer data for a service campaign running on a service provider network. The network device receives a customer authorization to share the customer data with an agent of the service provider network. The customer authorization includes session context information related to the presentation of the customer data. The network device determines if there are predictive options for the customer data. When there are no predictive options for the real-time customer data, the network device sends, to the customer device, a first feed of the real-time customer data and sends, to the agent device, the session context information and a second feed of the real-time customer data. The session context information enables the agent device to build an instance of the customer data that is similar to a presentation on the customer device, without sharing the customer screen view.

20 Claims, 14 Drawing Sheets

CUSTOMER VIEW

AGENT VIEW

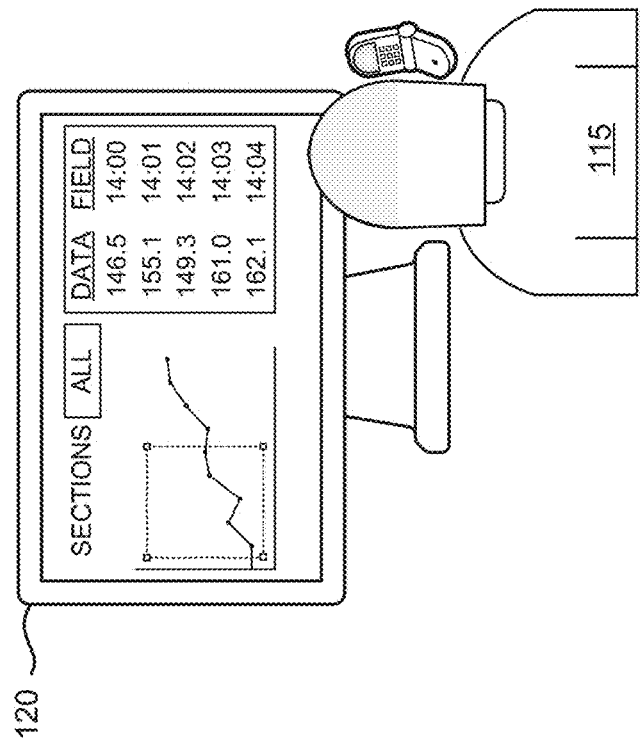
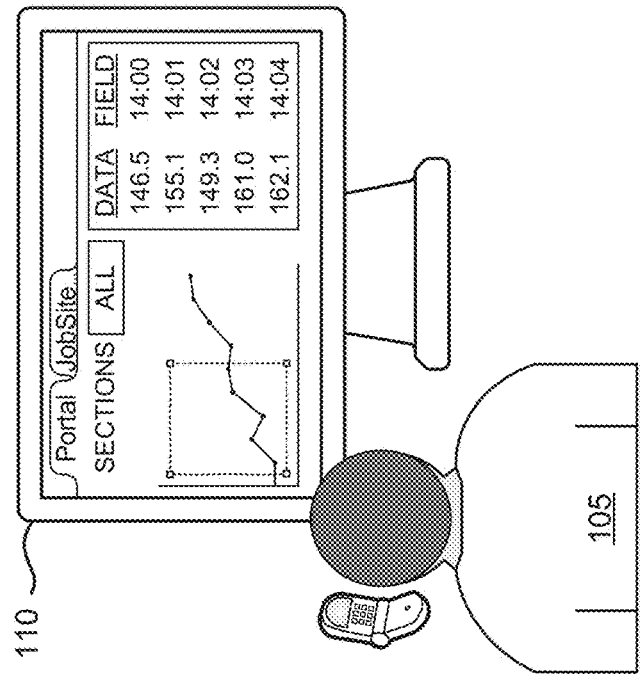
FIG. 1

FIG. 11A

CAMPAIGN: Customer Toll-Free Data Campaign

[ SUMMARY ] [ CUSTOMIZE ] [ RESULTS ] [ PREFS. ] [ SUPPORT ]

| SELECT | TITLE | TRAILER LAUNCH | TFD LAUNCH | Est. GB |
|---|---|---|---|---|
| ☐ | Movie#1 | 07-14-2015 | 08-04-2015 | 1250 |
| ● | Movie#2 | 07-31-2015 | 08-24-2015 | 1500 |
| ● | Movie#3 | 08-21-2015 | 08-21-2015 | 1750 |
| ☐ | Movie#4 | 10-18-2015 | 10-28-2015 | 1250 |

AGENT: Can you activate the 'support' option? This will allow me to see the same campaign data that's on your screen.

CUST: Will you see everything on the screen?

AGENT: If there's anything you don't want me to see you can just cover it with the 'mask' tool before you connect.

[ Ok ]

COMMON VIEW FOR CUSTOMER SUPPORT

BACKGROUND

Companies use call centers to address consumer inquiries and/or resolve consumer problems. A caller's call is often transferred to a device associated with a human agent to service the inquiry and provide desired assistance. The caller's inquiry often relates to information presented on a display screen of a computing device.

BRIEF DESCRIPTION OF THE DRAWINGS

FIG. 1 is a diagram illustrating a common view for customer support as described further herein;

FIGS. 11A-11D are device interfaces for an exemplary use case according to an implementation described herein.

DETAILED DESCRIPTION OF THE PREFERRED EMBODIMENTS

Figure 2:
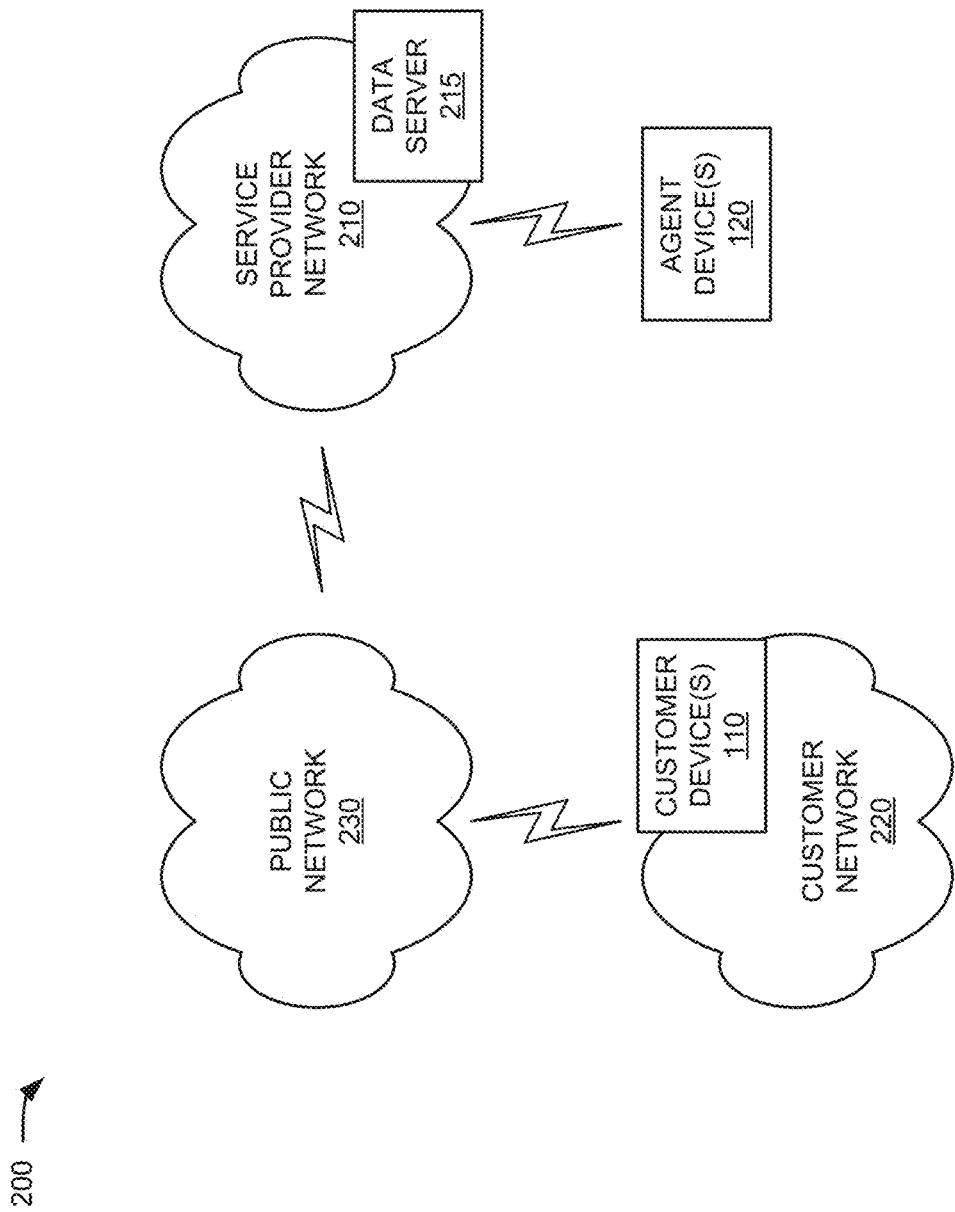
FIG. 2 is a diagram that depicts an exemplary network environment in which systems and methods described herein may be implemented.

The following detailed description refers to the accompanying drawings. The same reference numbers in different drawings may identify the same or similar elements.

Systems and methods described herein provide diagnostic and monitoring tools to enable agents to better assist customers of a service provider network. Customers of the service provider network may be entities that use Internet-based services offered via the service provider network. For example, customers may include content providers that provide content for consumption by end-users (end-users may also be referred to herein as "consumers"). Agents of the service provider network may be representatives that provide technical support for customer inquiries.

Customers may obtain diagnostic and monitoring information via a self-serve web portal to reduce the need for customer support calls and reduce wait times to obtain service status. Diagnostic results, real-time data, customized reports, and other information may be provided to each customer. When a customer contacts an agent for assistance, the customer's inquiry typically relates to information that the customer is viewing through the web portal. In order for the agent to understand the customer's problem, it may be necessary for the agent to see the same data that the customer is viewing through the web portal.

Screen sharing technology is not a preferred option for allowing the agent to view a customer's data. Particularly, screen sharing can raise privacy concerns because the agent is given access to other information on the customer's screen that may not be relevant to the customer's inquiry. Thus, systems and methods described herein provide a common view of data for customer support inquiries that permits customers and agents to interact with the same data, without using a screen view that may share unrelated customer information. Furthermore, systems and methods described herein permit more and different types of information to be integrated into what customers or agents are looking at, providing a more holistic high-fidelity view, rather than the agent being limited to a graphically identical view in a screen-sharing context.

FIG. 1 is a diagram illustrating concepts described herein. As shown in FIG. 1, a customer 105 may initiate a call with an agent 115 at a call center. The call may connect the customer 105 and agent 115 via, for example, a telephone connection or chat session. Customer 105 may have a question about particular information that customer 105 has accessed through a service provider web portal. The particular information may be presented, for example, via a web browser window or tab along with other information on a screen of a customer device 110. Customer 105 may authorize agent 115 to initiate a common view on a screen of agent device 120. Data from the service provider web portal may be fed to customer device 110 and agent device 120 and synchronized to permit a common view of the data in real-time. Only data relevant to the customer inquiry is shared with agent device 120, thus protecting the privacy of customer 105. As described further herein, the data views may be interactive. Thus, agent 115 may use the common view on agent device 120 to propose changes to a customer's campaign. The proposed changes and simulated effects may be presented in a common view on customer device 110 and agent device 120.

FIG. 2 is a diagram that depicts an exemplary network environment 200 in which systems and methods described herein may be implemented. As shown in FIG. 2, network environment 200 may include, a service provider network 210 including a data server 215, a customer network including one or more customer devices 110, a public network 230, and one or more agent devices 120. Components of network environment 200 may be connected via wired and/or wireless links. In one implementation, components in network environment 200 may communicate using application programming interfaces (API) to regulate interactions between devices and systems.

Customer device 110 may include a computational or communication device. Customer device 110 may enable a user to send/receive messages, view data/content, and interact with other devices. For example, customer device 110 may include a personal computer (e.g., a laptop or desktop PC), a tablet computer, a smart phone, or other types of computational or communication devices that can communicate with devices in network environment 200. In one implementation, customer device 110 may include a web browser or dedicated application configured to access data and services from devices in service provider network 210 via public network 230. In other implementations, customer device 110 may be configured to exchange instant messages or conduct chat sessions with one or more of agent devices 120.

Agent device 120 may include a computational or communication device. In one implementation agent device may be a device similar to customer device 110 that enables an agent to send/receive messages, view data/content, and interact with other devices. In contrast with customer devices 110, agent device 120 may be configured to access data and services from devices in service provider network 210 without going through public network. Particularly, in response to an inquiry from a user of customer device 110, agent device 120 may access data from service provider network 210 that relates to a particular customer account.

Service provider network 210 may include one or more wired, wireless and/or optical networks that are capable of receiving and transmitting data, voice and/or video signals, including multi-media signals that may include voice, data and video information (generally referred to herein as "services"). Service provider network 210 may include a wide area network (WAN), a metropolitan area network (MAN), an ad hoc network, an intranet, a satellite based network, a fiber optic-based network, and/or a combination of these or other types of networks. Additionally or alternatively, service provider network 210 may include a cellular network, a Public Land Mobile Network (PLMN), and/or another mobile network. In some implementations, service provider network 210 may provide redundancy and/or the ability to distribute network loads. For example, service provider network 210 may include an IP network or a multiprotocol label switching (MPLS) network implementing an Interior Gateway Protocol (IGP) or another protocol that implements a minimum cost end-to-end path for routing between nodes. Service provider network 210 may provide one or more interfaces to connect to client devices (e.g., customer device 110 or other devices residing on customer network 220).

Data server 215 may include one or more devices, such as server devices or network devices, that enable customers to configure and monitor services provided to consumers (e.g., clients of customer network 220). For example, data server 215 may provide a web portal that may enable an operator of a particular customer network 220 to configure and monitor a service campaign (such a marketing effort, a product launch, new content, or other Internet-based services). As a particular example, data server 215 may enable customers (e.g., operators of customer network 220 or other content providers) to register billing accounts and particular content for toll-free data services. As another particular example, data server 215 may provide configurable diagnostics to monitor customer services (e.g., network services associated with a particular customer service campaign) provided over service provider network 210 and systems integrated with service provider network 210. In one implementation, data server 215 may include or be in communication with forwarding boxes (not shown), in service provider network 210, that store performance metadata and physical configuration data that may affect the ability of service provider network 210 to support services for customers. According to implementations described herein, the forwarding boxes may respond to capabilities queries from data server 215 (or a controller) to communicate particular performance metadata and/or configurations within a software-define networking (SDN) environment.

Customer network 220 may include a local area network (LAN), a WAN, or a combination of networks that provide services to consumers. Customer network 220 may be managed, for example, by a customer (such as a content provider) that provides video and/or data services to consumers in conjunction with service provider network 210. Customer network 220 may include one or more gateway (GW) routers (e.g., customer premises equipment) that act as a secure gateway for devices (e.g., customer devices 110) within customer network 220.

Public network 230 may include a WAN, an intranet, a telephone network (e.g., the Public Switched Telephone Network), or a combination of networks. Public network 230 may include, for example, an untrusted network, such as the Internet. Public network 230 may further include transport and/or network devices such as routers, switches, and/or firewalls.

The number of customer devices 110, agent devices 120, service provider networks 210, data servers 215, customer networks 220, and public networks 230 illustrated in FIG. 2 is exemplary and provided for simplicity. More of these devices and other network devices, such as routers, gateways, switches, etc., may be included within the networks of network environment 200. In some embodiments, functions of devices in service provider network 210 may be performed by different devices or combinations of devices.

Figure 3:
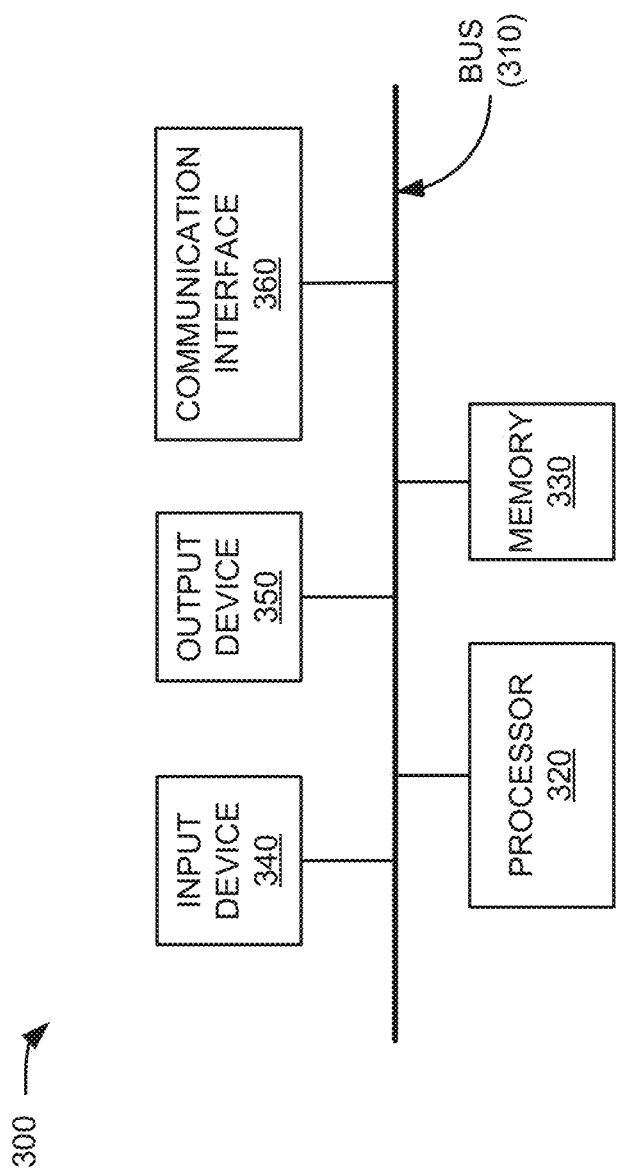
FIG. 3 is a diagram of exemplary components of one or more of the devices of FIG. 1 and/or FIG. 2.

FIG. 3 is a diagram illustrating exemplary components of device 300 according to an implementation described herein. Each of customer device 110, agent device 120, and components within data server 215 may include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a USB port for communications over a cable, a Bluetooth™ wireless interface, a RFID interface, a NFC wireless interface, and/or any other type of interface that converts data from one form to another form.

As will be described in detail below, device 300 may perform certain operations relating to providing a common view of data for customer support services. Device 300 may perform these operations in response to processor 320 executing software instructions contained in a computer-readable medium, such as memory 330.

Although FIG. 3 shows exemplary components of device 300, in other implementations, device 300 may include fewer components, different components, additional components, or differently-arranged components than those depicted in FIG. 3. Additionally or alternatively, one or more components of device 300 may perform one or more tasks described as being performed by one or more other components of device 300.

Figure 4:
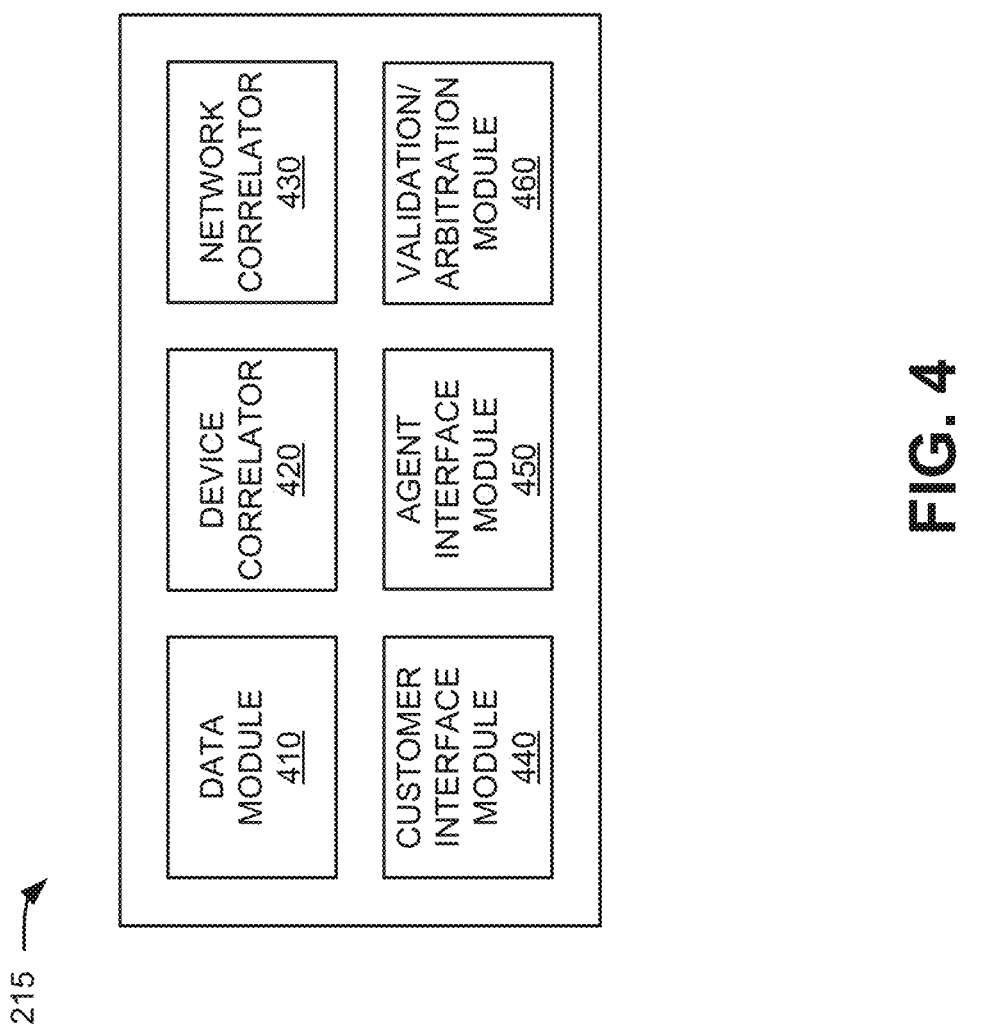
FIG. 4 is a block diagram of exemplary functional components of the data server of FIG. 2.

FIG. 4 is a diagram of exemplary functional components of data server 215. The functional components may be implemented by, for example, processor 320 in conjunction with memory 330. As shown in FIG. 4, data server 215 may include a data module 410, a device correlator 420, a network correlator 430, a customer interface module 440, an agent interface module 450, and a validation/arbitration module 460.

Data module 410 may track service provider data for network performance and/or resources associated with customers. For example, in one implementation, data module 410 may provide data for network services, security, and/or applications/hosting associated with a particular customer. Examples of data provided by data module 410 include network availability status, performance reporting, metric reporting, a network topology, fault and trouble management, security and/or threat identification services, and/or customer platform access services for the customer's network. In a further implementation, data module 410 may track bandwidth use data correlated to particular customer products and/or activities. Data module 410 may also incorporate thresholds for network activity to identify predictive trends. In one implementation, data for data module 410 may be updated in real time or near-real time.

Device correlator 420 may receive device parameters from customer device 110 to identify possible delay times for display of data on customer device 110 or agent device 120. In one implementation, device correlator 420 may assemble the parameters into device type profiles. Device parameters that device correlator 420 may receive from client device 110 may include, for example, a customer/agent identifier, a type of device, network access configurations, and an applicable software type (e.g., a browser type/version a dedicated application/version). The customer/agent identifier may include a unique alpha-numeric sequence for a particular user (e.g., of customer device 110 or agent device 120). The type of device may include a pre-defined description code for a type of customer device. The pre-defined codes may include a make and a model descriptor. For example, the codes may identify device types and/or operating systems to distinguish between when customer device 110 or agent device 120 is desktop computer running a Window's operating system and when customer device 110 or agent device 120 is an iPad 4th Generation tablet running iOS 8.3. The network access configurations may include an access capability (e.g., 3G, 4G, Wi-Fi, etc.) of customer device 110 or agent device 120. The applicable software type may include, for example, a type of web browser (e.g., Google Chrome 43, Firefox 37.0.2, etc.) or application (e.g., a custom application, or "app," to present data from service provider network 210). Device correlator 420 may apply known processing characteristics of the device parameters to determine a lag time for a display of data on customer device 110 and/or agent device 120.

Network correlator 430 may identify a location associated with customer device 110 (e.g., a geographical region relative to data server 215). Network correlator 430 may also identify a connection speed, a minimum bandwidth, a number of hops, and/or other characteristics of a network connection between, for example, customer device 110 and data server 215. In one implementation, network correlator 430 may also identify a location associated with agent device 120, along with a connection speed, a minimum bandwidth, and/or other characteristics of a network connection between, for example, agent device 120 and data server 215. The characteristics of the network connection for the network correlator 430 and the device parameters described above in connection with device correlator 420 may be referred to as session context information.

Customer interface module 440 may generally enable display of data from data module 410 on customer device 110. Customer interface module 440 may, for example, provide a user interface (e.g., via a web browser or dedicated application on customer device 110) to solicit and receive user login credentials, present data, and apply configuration settings for the presentation of data from data module 410 that relates to a particular service campaign for the customer. In one implementation, when a user of customer device authorizes access for an agent (e.g., the agent using agent device 120) to view the customer data, customer interface module 440 may synchronize the presentation of data that is displayed on customer device 110 and agent device 120, respectively, to allow for a precisely simultaneous presentation. For example, it may be assumed that customer device 110 will experience a greater time lag in receiving/presenting data from data module 410 than agent device 120 will have in receiving/presenting the same data from data module 410 (although embodiments herein are not limited to this assumption). The proximity of agent device 120 to data server 215 and a direct connection to service provider network 210 may provide faster connection speeds than a customer device 110 that has to traverse customer network 220 and public network 230 before accessing service provider network 210. Thus, customer interface module 440 may "speed up" presentation of data on customer device 110 to correspond to the display of data on agent device 120.

Particularly, customer interface module 440 may use information from device correlator 420 and network correlator 430 to identify, and compensate for, a lag interval between the display of data from data module 410 as presented on customer device 110 and the display of data from data module 410 as presented on agent device 120. Customer interface module 440 may apply predictive algorithms compensate for the relative delay experienced by customer device 110. The predictive algorithms may, for example, apply known historical data trends to real-time data to compensate for the lag interval between receiving/display data on customer device 110 and receiving/display data on agent device 110 when the data is sent from data server at the same time. In another implementation, customer interface module 450 may compensate for the lag interval between customer device 110 and agent device 120 along with compensating for a communication lag for a corresponding telephone communication between the user of customer device 110 and the agent at agent device 120.

Customer interface module 440 may also receive and implement user input from customer device 110. For example, customer interface module 440 may receive user input to enforce privacy settings and/or block sharing of particular data with an agent. In other implementations, customer interface module 440 may allow for modification of campaign settings and/or diagnostic services, approval of changes proposed by an agent, or proposing changes that can be implemented by an authorized agent. The customer input may be received via customer interface module 440 and relayed to agent interface module 450 and/or validation/arbitration module 460 for implementation.

Agent interface module 450 may generally enable display of data from data module 410 on agent device 120. Agent interface module 450 may, for example, provide a user interface (e.g., via a web browser or dedicated application on agent device 120) to solicit and receive agent login credentials, identify a corresponding customer data feed, apply configuration settings for the presentation of the customer data, and present the customer data. In one implementation, when a user of customer device 110 authorizes access for an agent (e.g., the agent using agent device 120) to view the customer data, agent interface module 450 may synchronize the simultaneous presentation of data that is displayed on customer device 110 and agent device 120 by "slowing down" presentation of data on agent device 120 to correspond to the display of data on customer device 110. The feed to agent device 120 may be delayed, for example, through queuing and buffering, etc. Particularly, agent interface module 450 may use information from device correlator 420 and network correlator 430 to identify and compensate for a lag interval between the display of data from data module 410 as presented on customer device 110 and the display of data from data module 410 as presented on agent device 120. Thus, agent interface module 450 may delay delivery of real-time data from data module 410 for an interval of time that may correspond to the difference in communication delay between customer device 110/data module 410 and agent device 120/data module 410.

Agent interface module 450 may also receive and implement user input from an agent at agent device 120. For example, as described below in connection with FIG. 6, agent interface module 450 may receive agent input to change campaign configurations or diagnostic settings for a customer. The agent input may be received via agent interface module 450 and relayed to customer interface module 440 and/or validation/arbitration module 460 for implementation. In another implementation, agent interface module 450 may insert marker or place-holders into the agent view to maintain continuity with the shared data presentations that include masked data, as indicated on customer device 110.

Validation/arbitration module 460 may receive proposed changes from agent interface module 450 or customer interface module 440. Validation/arbitration module 460 may confirm or reject feasibility of the changes based on, for example, network policies, capacity limitations, subscription limitations, etc. In one implementation, validation/arbitration module 460 may evaluate current or projected network activity to ensure that a change to the customer campaign can be performed at a current or scheduled time without adversely impacting network performance. In another implementation, validation/arbitration module 460 may model a proposed change to determine its impact on service provider network 210 and other customers of service provider network 210. For example, validation/arbitration module 460 may apply additional bandwidth requirements, network connections, etc. for a proposed change to a simulation of service provider network 210. If validation/arbitration module 460 determines that a proposed change is feasible and not in conflict with other customers, validation/arbitration module 460 may provide a simulated data view of the proposed change to customer device 110 and agent device 120. Validation/arbitration module 460 may use customer interface module 440 and agent interface module 450 to request a confirmation from one or more of the customer (using customer device 110) and the agent (using agent device 120) regarding the acceptance of the proposed change. In another implementation, customer device 110 may implement automated inquiries to initiate a proposed change and arbitration for a service campaign. For example, customer device 110 may have multiple proposed changes that may be stored and asynchronously submitted based on results from validation/arbitration module 460 (and/or an agent's response).

Although FIG. 4 provides exemplary functional components of data server 215, in other implementations data server 215 may include additional, fewer, or different functional components. For example, functions of customer interface module 440 directed to customer device 110 and functions of agent interface module 450 directed to agent device 120 may alternatively be provided to their counterpart devices to synchronize presentation of data.

Figure 5:
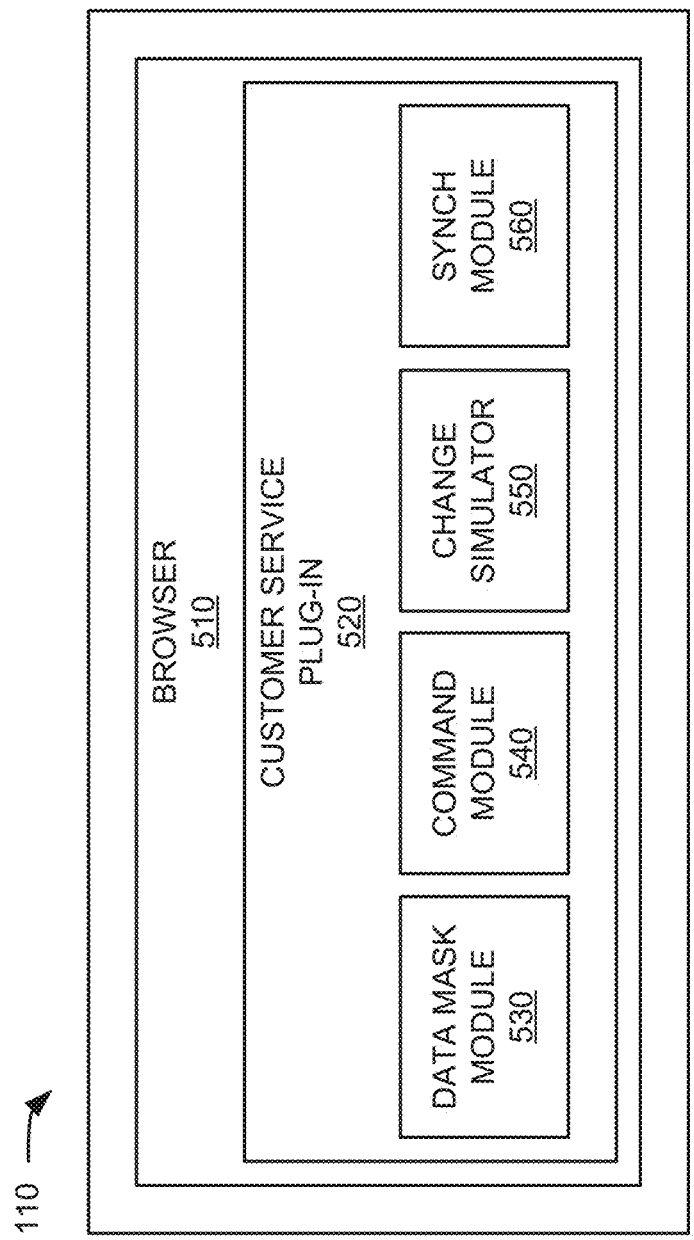
FIG. 5 is a block diagram of exemplary functional components of the customer device of FIG. 1.

FIG. 5 is a block diagram of exemplary functional components of customer device 110. The functional components may be implemented by, for example, processor 320 in conjunction with memory 330. As shown in FIG. 5, customer device 110 may include a browser 510 that includes a customer service plug-in 520. The customer service plug-in may include a data module 530, a command module 540, a change simulator 550, and a synch module 560.

Browser 510 may include a web browser to access data server 215. For example, browser 510 may support hypertext transfer protocol secure (HTTPS) communications to enable a user of customer device 110 to access data from data module 410 (e.g., via customer interface module 440).

Customer service plug-in 520 may allow a user of customer device 110 to activate a common view, between customer device 110 and agent device 120, for customer support. In one implementation, customer service plug-in 520 may include a user activation menu to allow a customer to initiate a common view with an agent. For example, in conjunction with a telephone call or chat session between the customer and the agent, the agent may request the user of customer device 110 to enable a common view. The user's selection of the common view option may be signaled to data server 215 to allow the agent to view the customer data from data server 215.

In one implementation, customer service plug-in 520 may communicate, to data server 215, in the request to enable a common view device information (as used, for example, by device correlator 420 described above) and network connection information (as used, for example, by network correlator 430 described above). Using this information (along with other information collected by data server 215), customer interface module 440 may provide synchronized data to customer device 110 and agent device 120.

Data mask module 530 may provide a selection mechanism to mask (or make private) particular data from the agent's common view. For example, a user of customer device 120 may select or highlight particular data fields shown on a screen of customer device 120. Data mask module 530 may indicate the data selected for masking and signal to data server 215 to mask the selected data from agent device 120. Data mask module may, for example, associate highlighted screen coordinates with particular data field or objects in the customers' graphical user interface. In one implementation, placeholders may be inserted into the agent view to maintain continuity with the shared data presentation.

Command module 540 may provide a selection mechanism to propose changes, to customer settings, that can be implemented by the agent and/or tested. Additionally, command module 540 may provide a user input mechanism to approve changes proposed by an agent in a common view setup.

Change simulator 550 may receive simulated data, corresponding to a proposed change, from data server 215. In one implementation, change simulator 550 may include a banner or other notification (e.g., use of color, transparency, etc.) to distinguish a proposed/simulated change from real-time customer data.

Synchronization module 560 may apply algorithms to "speed up" or "slow down" presentation of data on customer device 110 to provide synchronized viewing of data with agent device 120. For example, synchronization module 560 may apply lag times from speed tests, etc. to synchronization algorithms provided to customer device 110 by data server 215. In another implementation, synchronization module 560 may apply algorithms to "speed up" or "slow down" data that is not actually presented by customer device 110 (e.g., on a display) but is used by customer device 110 for other purposes. For example, customer device 110 may use data from synchronization module 560 to propose and/or approve changes using automated systems that would not require visual presentation of synchronized data. Thus, data from synchronization module 560 could be applied directly into customer algorithms.

Figure 6:
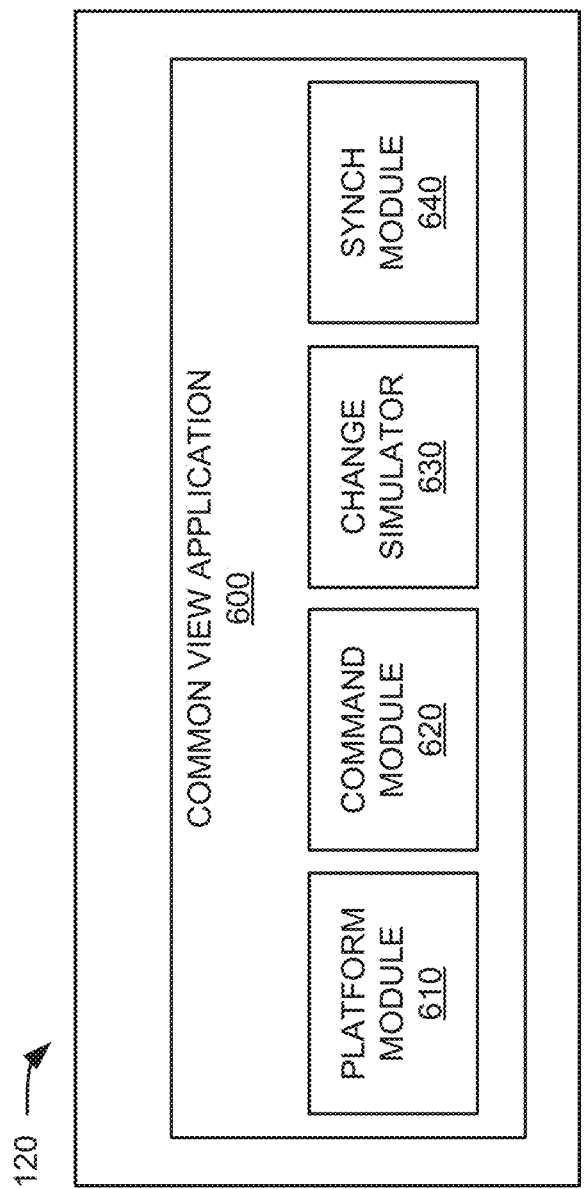
FIG. 6 is a block diagram of exemplary functional components of the agent device of FIG. 1.

FIG. 6 is a block diagram of exemplary functional components of agent device 120. The functional components may be implemented by, for example, processor 320 in conjunction with memory 330. As shown in FIG. 6, agent device 120 may include a common view application 600 with a platform module 610, a command module 620, a change simulator 630, and a synch module 640.

Common view application 600 may allow a user of customer device 110 to request a common view, between customer device 110 and agent device 120, of customer data. Common view application 600 may receive, from data server 215, an identical data feed as is sent to customer device 110 with adjustments for display timing being applied by either agent device 120 or data server 215 in some implementations.

Platform module 610 may receive session context information, from data server 215, of the session between customer device 110 and data server 215. Platform module 610 may use the session context information to simulate on agent device 120 the presentation layout of customer data on customer device 110.

Command module 620 may provide a selection mechanism to propose changes, to customer settings, that can be simulated by data server 215 and/or approved by the customer. Additionally, command module 620 may provide a user input mechanism to approve/authorize changes proposed by a customer in a common view setup with the agent.

Similar to change simulator 550, change simulator 630 may receive simulated data, corresponding to a proposed change, from data server 215. In one implementation, change simulator 630 may include a banner or other notification to distinguish a proposed/simulated change from real-time customer data.

Synchronization module 640 may apply algorithms to "speed up" or "slow down" presentation of data on agent device 120 to provide synchronized viewing of data with customer device 120. For example, synchronization module 640 may apply lag times from speed tests, etc. to synchronization algorithms provided to agent device 120 by data server 215. In another implementation, synchronization module 640 may apply algorithms to "speed up" or "slow down" data that is not actually presented by agent device 120 (e.g., on a display) but is used by agent device 120 for other purposes. For example, agent device 120 may use data from synchronization module 640 to propose and/or approve changes using automated systems that would not require visual presentation of synchronized data. In such an example, data from synchronization module 640 could be applied directly into algorithms of service provider network 230.

Although FIGS. 5 and 6 provide exemplary functional components of customer device 110 and agent device 120, respectively, in other implementations customer device 110 and agent device 120 may include additional, fewer, or different functional components. For example, some functions of customer device 110 and agent device 120 described above may alternatively be performed by data server 215.

Figure 7:
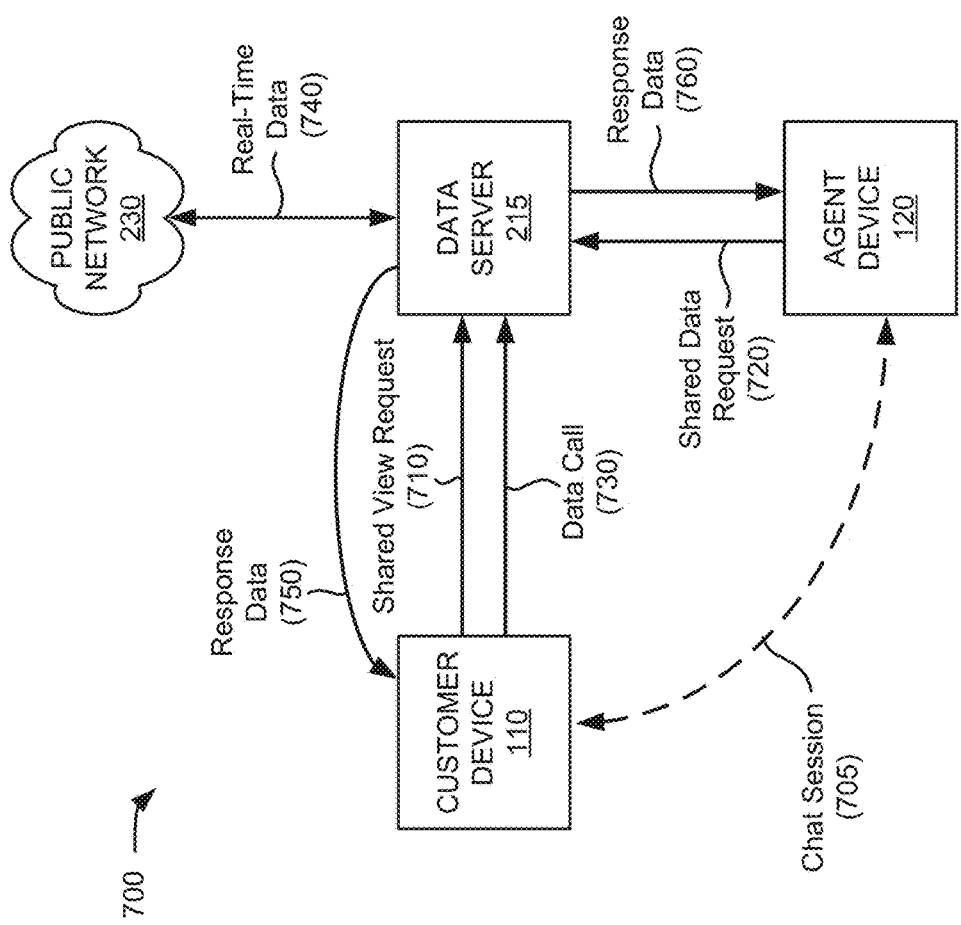
FIG. 7 is a diagram of exemplary communications among devices in a portion of the network environment of FIG. 2.

FIG. 7 is a diagram of exemplary communications among devices in a portion 700 of network environment 200. Communications in FIG. 7 may represent communications for implementing a common view for customer support of network services. As shown in FIG. 7, network portion 700 may include an optional chat session 705 between customer device 110 and agent device 120. Chat session 705 may allow communication between customer 105 (FIG. 1) using customer device 110 and agent 115 (FIG. 1) using agent device 120 that may result in an eventual need to allow the agent 115 to view data presented on customer device. In another implementation, chat session 705 may be replaced with a telephone conversation between customer 105 and agent 115.

Based on a selection from customer 105 (e.g., as guided by an agent via chat session 705), customer device 110 may send a shared view request 710 to data server 215. Shared view request 710 may include a signal to authorize presentation of a simulated view on agent device 120. Shared view request 710 may also include session context information, such as a connection speed between customer device 110 and data server 215. Shared view request 710, with device/ connection information, is shown as a single communication for simplicity. In another implementation, shared view request 710 may include multiple communication exchanges. For example, shared view request 710 may be responsive to a query initiated by agent device 120.

Based on discussions with customer 105 (e.g., via chat session 705 or telephone), agent 115 may use agent device 120 to send a shared data request 720 to data server 215. Shared data request 720 may include an identifier for customer device 110 (e.g., an account number or another identifier retrieved from customer 105) and an identifier for agent device 120 to indicate data from which customer device session is to be shared with agent device 120. In one implementation, shared data request 720 may also include device/connection information, such as a connection speed between agent device 120 and data server 215.

Customer device 110 may send a data call 730 to data server 215. Data call 730 may include a call for particular information to populate a web page associated with a customer campaign. For example, data call 730 may request account information associated with a particular service that the customer is offering via service provider network 210.

Data server 215 may collect real-time data 740 from devices in public network 230 and service provider network 210 (not shown in FIG. 7). In response to data call 730, data server 215 may provide the responsive data from real-time data 740 to customer device 110 as response data 750. Similarly, based on shared data request 720, data server 215 may provide the responsive data from real-time data 740 to agent device 120 as response data 760. Response data 750 and response data 760 may include the same data from real-time data 740; however the timing of presentation on each of customer device 110 and agent device 120 may vary due to differences in network connectivity. In one implementation, device/connection information from shared data request 720 may be provided to customer device 110 with response data 750, and device/connection information from shared view request 710 may be provided to agent device 720 with response data 760.

Customer device 110 may apply device and/or network correlation information to response data 750. For example, customer device 110 may calculate a lag time between communications from data server 215 to customer device 110 and communications from data server 215 to agent device 120. In one implementation, customer device 110 may apply predictive algorithms to "speed up" presentation of data on customer device 110 to synchronize presentation of data on customer device 110 and agent device 120.

Additionally, or alternatively, agent device 120 may apply device and/or network correlation information to response data 760. For example, agent device 120 may calculate a lag time between communications from data server 215 to customer device 110 and communications from data server 215 to agent device 120. In one implementation, agent device 120 may add delays to "slow down" presentation of data on agent device 120 to synchronize presentation of data on customer device 110 and agent device 120.

Figure 8:
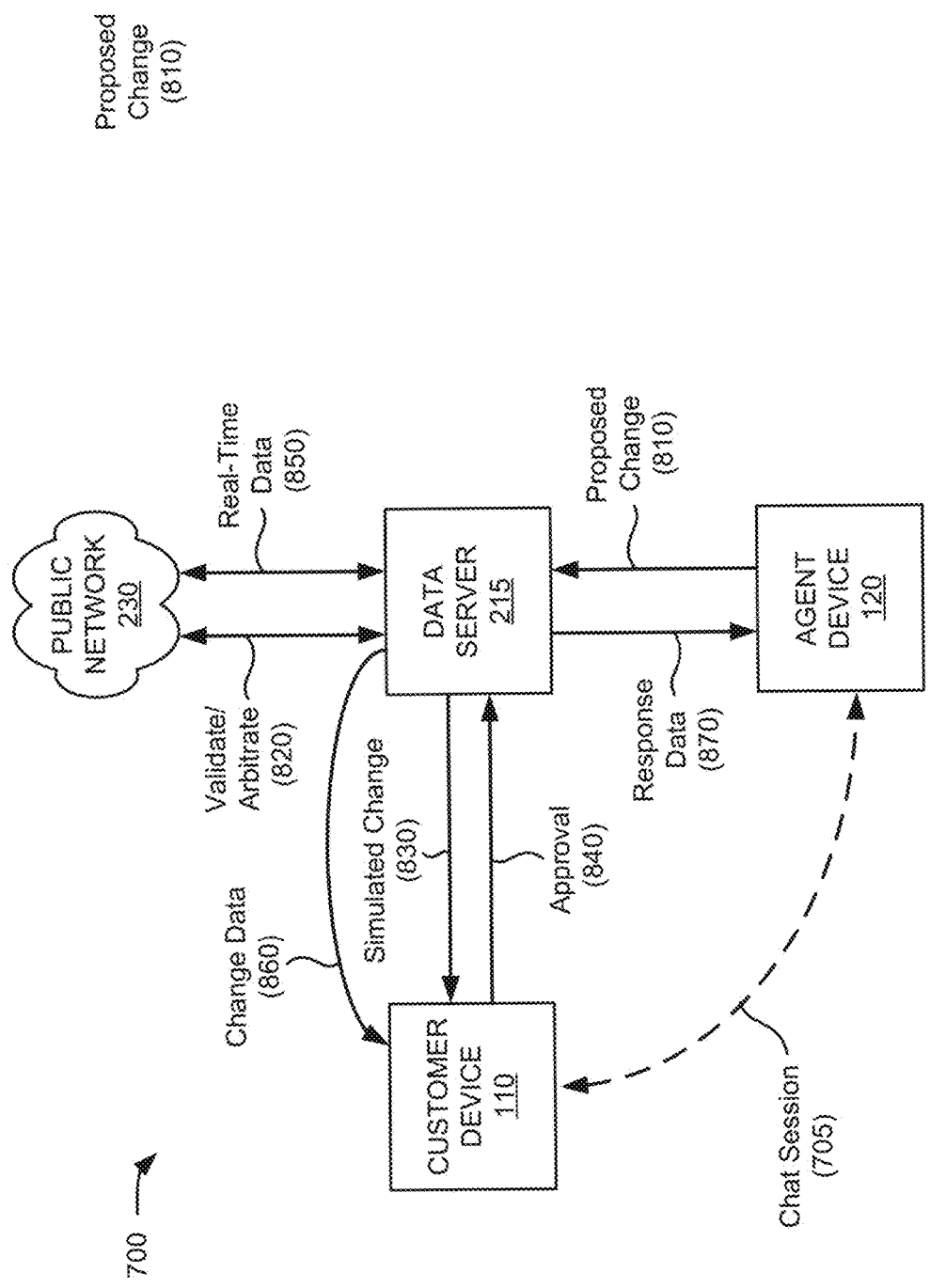
FIG. 8 is a diagram of additional exemplary communications among devices in the portion of the network environment of FIG. 2.

FIG. 8 is a diagram of other exemplary communications among devices in network portion 700. Communications in FIG. 8 may represent communications for presenting and authorizing configuration changes to data for network services.

As part of an ongoing customer support call implementing a common view (e.g., as established in communications of FIG. 7), an agent at agent device 120 may propose a change (e.g., a configuration change for the customer's campaign) and send proposed change 810 to data server 215. Data server 215 may perform a validation and/or arbitration 820 relative to the proposed change. For example, data server 215 may apply proposed change 810 in a simulation mode to model the impact of proposed change 810 in service provider network 210 and over network 230. In one implementation, proposed change 810 may be implemented within a restricted set of system resources, similar to a sandbox for software development, to simulate the effects of proposed change 810. In another aspect, validation/arbitration 820 may include prioritizing and/or auctioning of network resources among multiple customers.

Data server 215 may provide the simulated effects of proposed change 810 to customer device 110 as simulated change 830. Customer 105 may view the proposed change and its simulated effects on customer device 110. Customer 110 may provide a feedback interface to approve or reject the proposed change. Assuming customer 105 provides user input to approve simulated change 830, customer device 110 may send approval 840 to data server 215 to incorporate the configuration of proposed change 810. Data server 215 may receive approval 840 and apply the configuration of proposed change 810 as an actual configuration change.

Data server 215 may continue to collect real-time data 850 from devices in public network 230 and service provider network 210, including data as a result of the actual configuration change approved by approval 840. Data server 215 may provide the data from real-time data 850 to customer device 110 as change data 860. Similarly, data server 215 may provide the data from real-time data 850 to agent device 120 as response data 870. As described above in connection with FIG. 7, customer device 110 may apply device and/or network correlation information to change data 860, and agent device 120 may apply device and/or network correlation information to response data 760, to provide a synchronized presentation on customer device 110 and agent device 120.

Although FIGS. 7 and 8 are described in the context of providing a synchronized presentation of data, in other implementations the communications of FIGS. 7 and 8 may be used to provide instances of synchronized data that can be used (e.g., by customer device 110 or agent device 120) for other purposes. In other implementations, one or both of customer device 110 or agent device 120 may be headless devices, such that customer device 110 or agent device 120 may apply synchronized data without an actual presentation on a display. Thus, one or more of customer device 110 or agent device 120 may obtain an instance of synchronized real-time data that can be used by processor 320 (FIG. 3) or another system without display by output device 350. For example, customer device 110 or agent device 120 may include capabilities to perform an automated change negotiation without human intervention.

Figure 9:
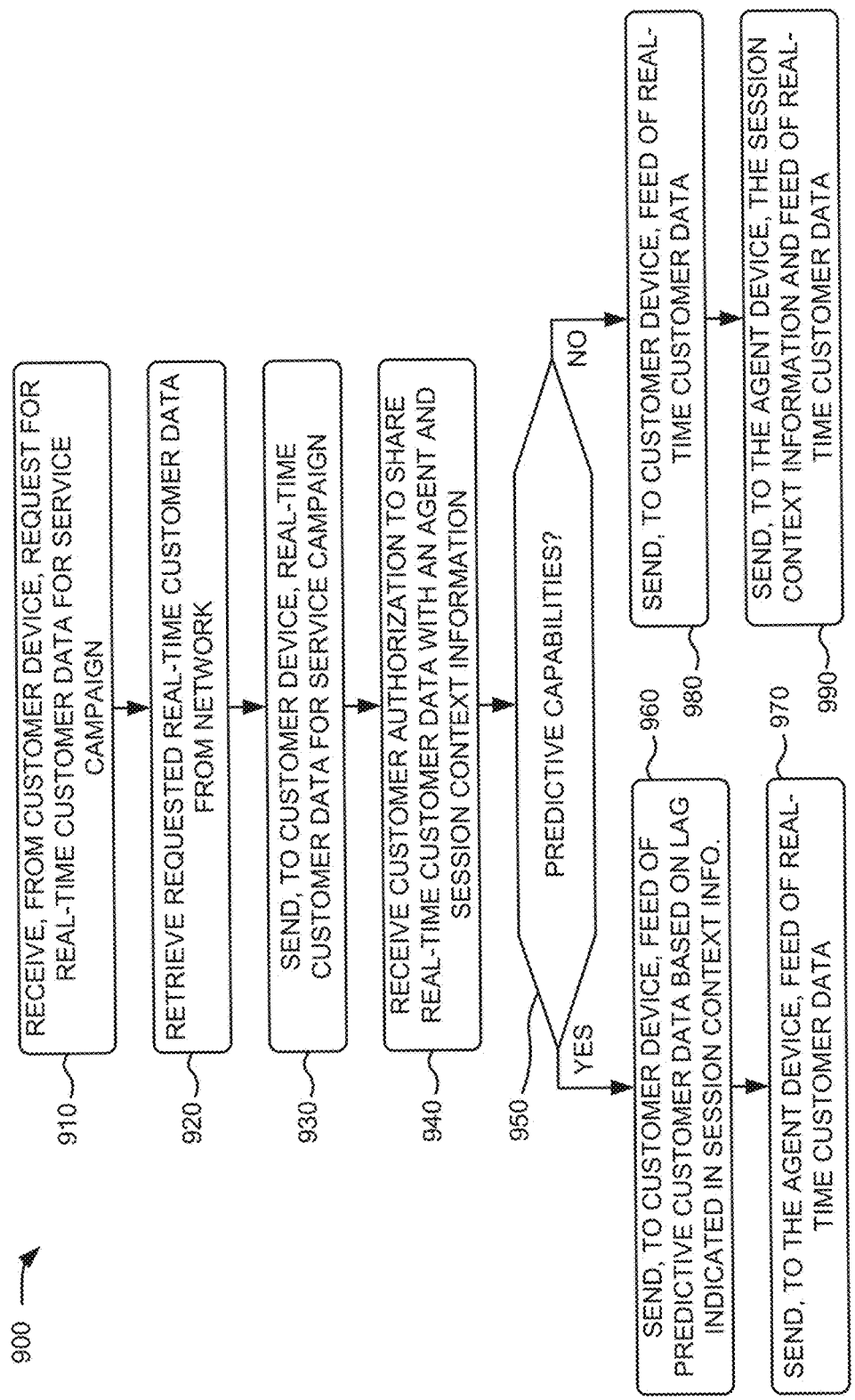
FIGS. 9 and 10 are flow diagrams that illustrate an exemplary process for implementing common data for customer support of network services, according to an implementation described herein.

FIG. 9 is a flow diagram that illustrates an exemplary process 900 for implementing common data for customer support of network services. In one implementation, process 900 may be implemented by data server 215. In another implementation, process 900 may be implemented by data server 215 in conjunction with one or more other devices in network environment 200.

Process 900 may include receiving, from a customer device, a request for real-time customer data for a service campaign (block 910), and retrieving the real-time customer data (block 920). For example, data server 215 may receive a request from customer device 110 to access service campaign data for the customer via a secure web page. Data server 215 may collect real-time data from devices in public network 230 and/or service provider network 210 for the service campaign running via a service provider network 210.

Process 900 may also include sending, to a customer device, the real-time customer data for the service campaign (block 930) and receiving a customer authorization to share the real-time customer data with an agent device (block 940). For example, data server 215 may send to a customer device 110 the real-time customer data. In response to a prompt from an agent (e.g., via a chat session or phone call), customer device 110 may authorize a session to share the real-time customer data with agent device 120. In one implementation, the authorization including session context information for the current session (e.g., a TCP/IP session) between customer device 110 and data server 215. In another implementation, customer device 110 may provide the session context information to data server 215 separately from the authorization.

Process 900 may further include determining when there are predictive options for the real-time customer data (block 950). For example, depending on the type of real-time data associated with the customer's service campaign, data server 215 may determine when some or all of the real-time data can be "sped up" using predictive algorithms to synchronize display timing with agent device 110.

When there are predictive options for the real-time customer data (block 950—YES), process 900 may additionally include sending, to the customer device, a feed of predictive customer data based on lag times indicated in the session context information (block 960), and sending, to the agent device, a feed of the real-time customer data (block 970). For example, data server 215 may determine that predictive algorithms may be accurately applied to data on the customer feed to synchronize display timing with agent device 110. Data server 215 may determine a timing difference (or lag time) between the display of data on customer device 110 and the display of data on agent device 120. The timing difference may be applied to the predictive algorithm to synchronize the display timing of customer data between customer device 110 and agent device 120. Data server 215 may send a customer feed with the data based on the predictive algorithm to customer device 110. Data server 215 may send the corresponding real-time data feed to agent device 120.

When there are no predictive options for the real-time customer data (block 950—NO), process 900 may further include sending, to the customer device, a feed of the real-time customer data (block 980) and sending, to the agent device, the session context information and a feed of the real-time customer data (block 990). For example, data server 215 may determine that no predictive algorithms can be accurately applied to data on the customer feed to synchronize display timing with agent device 110. Data server 215 may send the real-time data feed to customer device 110. Data server 215 may also send the real-time data feed to agent device 120 along with the session context information from customer device 110, in order to enable agent device 120 to build an instance of the real-time customer data that is similar to a presentation of the real-time customer data on customer device 110. In another implementation, data server 215 may calculate the timing difference (or lag time) between the display of data on customer device 110 and the display of data on agent device 120 and simply delay sending the data feed to agent device 120 by the lag time.

Figure 10:
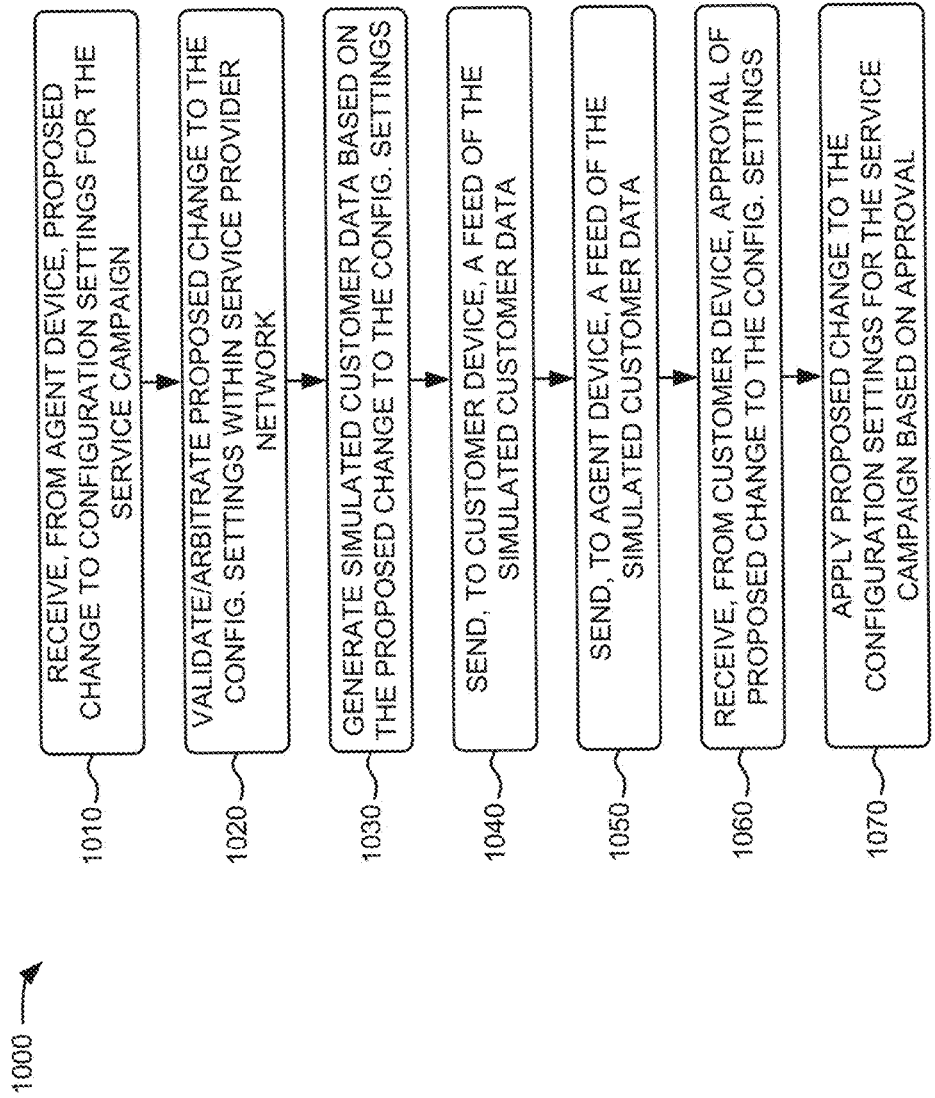

FIG. 10 is a flow diagram that illustrates an exemplary process 1000 for implementing a common view for customer support of network services. In one implementation, process 1000 may be implemented by data server 215. In another implementation, process 1000 may be implemented by data server 215 in conjunction with one or more other devices in network environment 200. In process 1000, assume an existing common view session between customer device 110 and agent device 120 (e.g., as established in FIG. 9) is already in progress.

As shown in FIG. 10, process 1000 may include receiving, from an agent device, a proposed change to configuration settings for the service campaign (block 1010). For example, in conjunction with a service call from customer 105, agent 115 may use agent device 120 to adjust configuration settings for a service campaign to address a question from customer 105. In another implementation, the proposed changes may be initiated by an automated system associated with agent device 120. The proposed changes may be provided to data server 215.

Process 1000 may also include validating and/or arbitrating the proposed change to the configuration settings within service provider network (block 1020), and generating simulated customer data based on the proposed change to the configuration settings (block 1030). For example, data server 215 may receive the proposed changes from agent device 120 and may validate the proposed changes to determine, for example, if service provider network 230 resources and policies can support the proposed changes. Data server 215 may also arbitrate the proposed changes against changes from other customers of service provider network to determine if conflicts exist with other pending changes and to prioritize changes. Assuming the proposed change is allowed, data server 215 may generate a simulated data that incorporates the proposed changes.

Process 1000 may further include sending, to the customer device, a feed of the simulated customer data (block 1040) and send, to agent device, the feed of the simulated customer data (block 1050). For example, data server 215 may provide the simulated data to customer device 110 and agent device 120. In one implementation, data server 215 may "speed-up" the simulated data to one of customer device 110 or agent device 120 to provide synchronized views (e.g., as described above in connection with FIG. 9). Alternatively, data server 215 may "slow down" the simulated data to one of customer device 110 or agent device 120 to provide synchronized views (e.g., as also described above in connection with FIG. 9).

Process 1000 may additionally include receiving, from customer device, approval of proposed change to the configuration settings (block 1060) and applying proposed change to the configuration settings for the service campaign based on approval (block 1070). For example, if customer 105 agrees with the proposed changes, customer 105 may signal through customer device 110 to accept the proposed change. In another implementation, the signal to accept the proposed change may be initiated by an automated system associated with customer device 110. Data server 215 may receive the acceptance signal and may apply the changes as actual changes in service provider network 210.

Figure 11B:
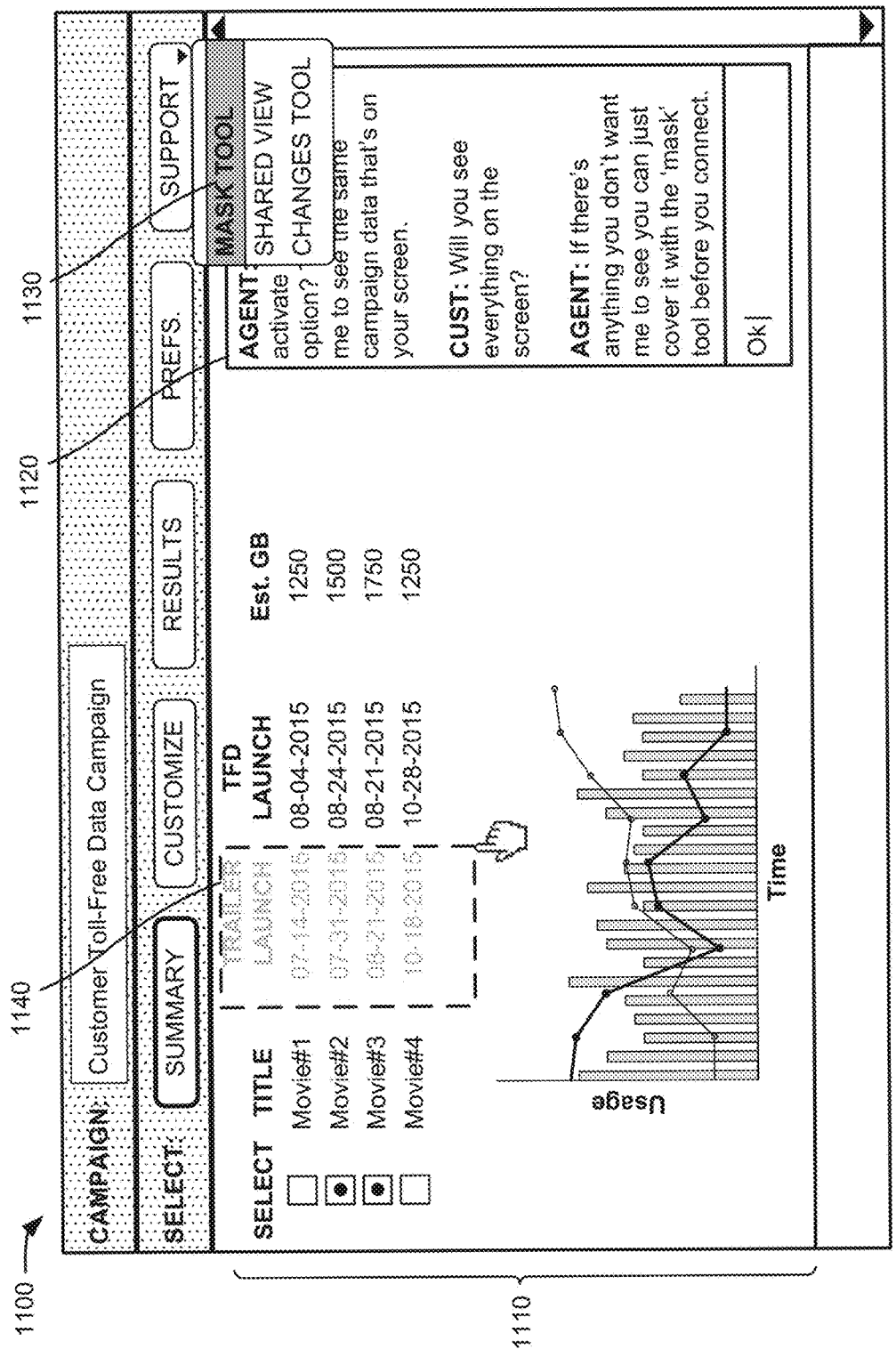
Figure 11C:
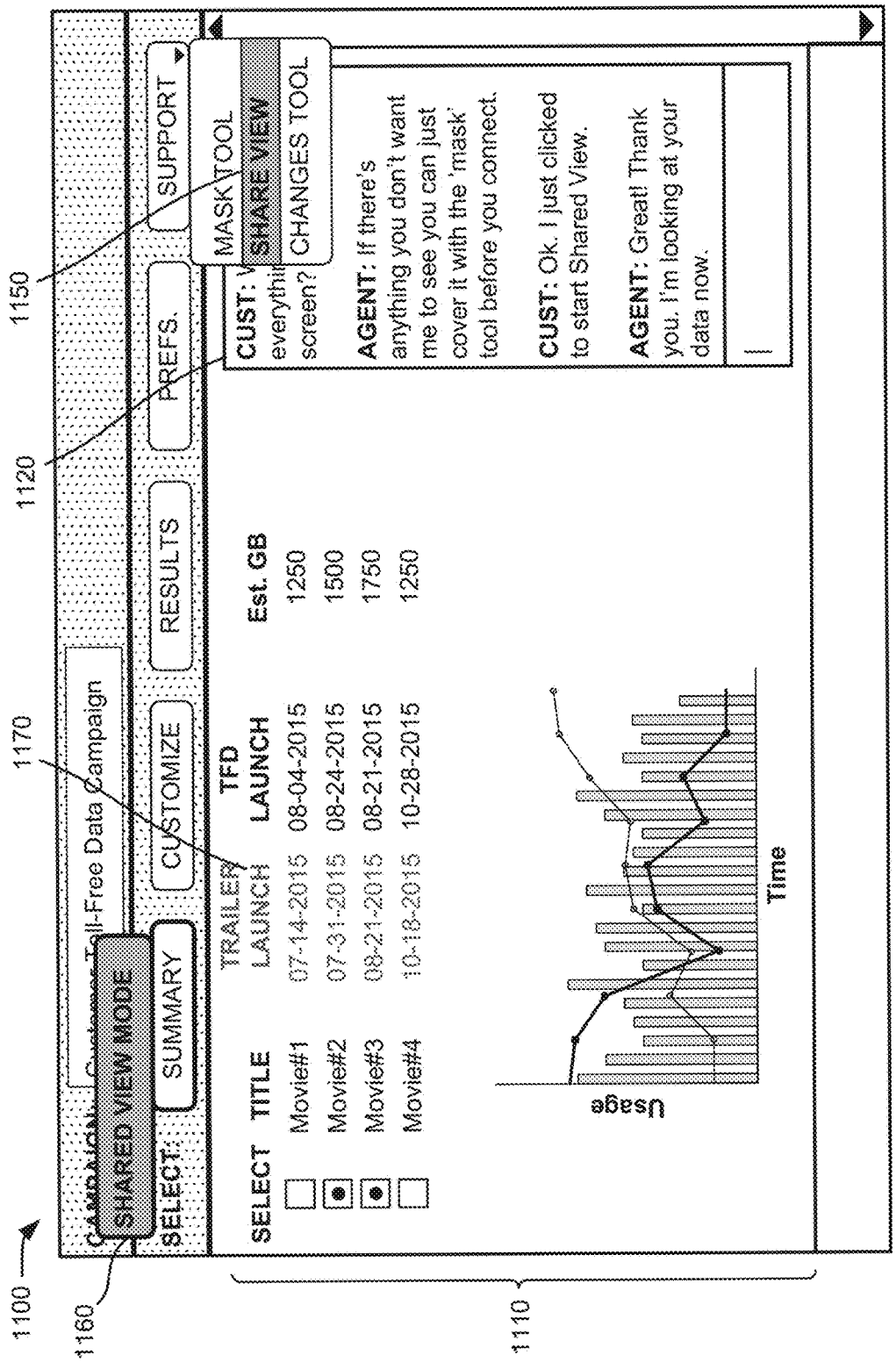
Figure 11D:
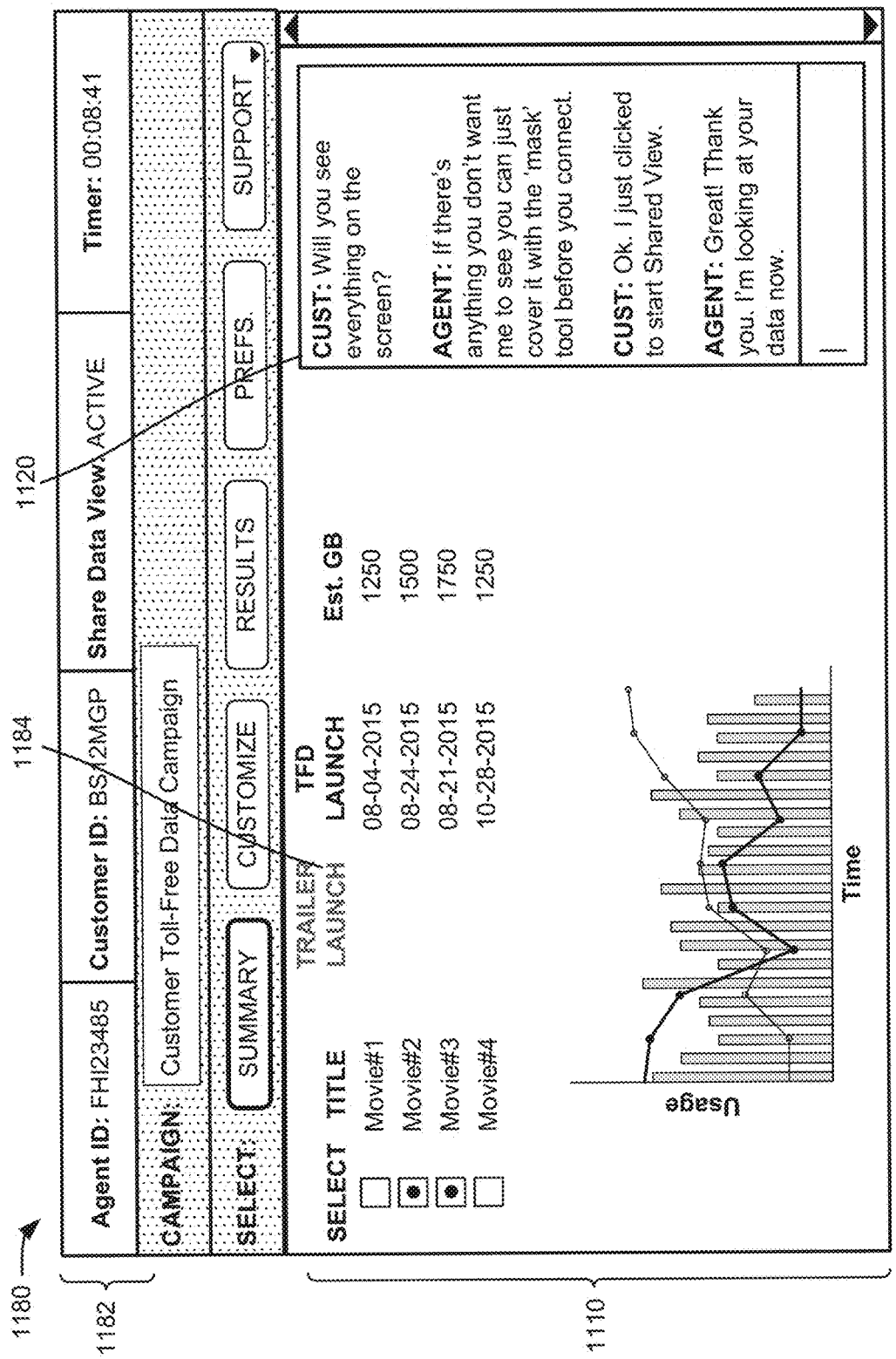

FIGS. 11A-11C are exemplary customer device interfaces for an exemplary use case according to an implementation. FIG. 11D is an exemplary agent device interface corresponding to the customer device interface of FIG. 11C. For FIGS. 11A-11D, assume a customer is using service provider network 210 to manage a toll-free data campaign that supports marketing of movies and on-demand media through social media. In the toll-free data campaign mobile subscribers can access particular content (such as movie trailers) without impacting their monthly wireless data plan. In the toll-free data campaign, websites or mobile apps registered as toll-free content will be free for the consumers, and data charges can be billed directly to the sponsoring customer instead of the consumer's personal account. Links to the toll-free content can be shared, for example, through social media sites.

FIGS. 11A-11C provide a customer view 1100 (e.g., on customer device 110) of real-time data 1110 that may be obtained from data server 215. The customer view 1100 may be arranged, in this example, to track toll-free data usage for particular trailers leading up to a movie release date. Other information that is unrelated to the customer campaign (not shown) may be included elsewhere on a screen of customer device 110.

Referring to FIG. 11A, assume the customer has a question relating to data 1110 and that a chat session is initiated with an agent, as shown in chat box 1120. The agent may request access to the customer data (e.g., a common view) to help resolve the customer's question.

Referring to FIG. 11B, assume the customer has particularly sensitive data on the screen that the customer does not want to disclose to the agent (even though the data may already be stored within service provider network 210). The customer may select a mask tool option 1130 from a user interface menu on customer view 1100. Mask tool option 1130 may allow the customer to identify data fields to mask/hide from an agent during a common view. As shown in FIG. 11B, the customer may select a particular data type or field to mask using mask tool 1140.

Referring to FIG. 11C, after identifying data to mask from the agent's view, the customer may select a share view option 1150 to initiate a synchronized common view of data 1110. A shared view notification 1160 may be presented on customer view 1100 to indicate that data 1110 is being shown to an agent. Data fields previously selected for masking via making tool 1140 may be shaded or otherwise indicated via indications 1170, so that the customer is aware of what data (if any) is not visible to the agent.

FIG. 11D provides an agent view 1180 (e.g., on agent device 120) of real-time data 1110 that may be obtained from data server 215. Referring to FIG. 11D, agent view 1180 may include agent information 1182 that may be relevant to the agent. Real time data 1110 may be the same as shown on customer view 1100 (FIG. 11C), but masked fields 1184 may be excluded. In one implementation, field headers and/or data place holders (not shown) may be used for masked data in agent view 1180 to maintain a similar data layout to that of customer view 1100. As described above, data 1110 in either of customer view 1100 and agent view 1180 may be "sped up" or "slowed down" to permit a synchronized presentation on customer device 110 and agent device 120 without providing the shared screen access to the agent. One the shared data view is in place, the agent or customer may propose changes and share simulated views to resolve customer questions.

According to systems and methods described herein, a network device may send, to a customer device, real-time customer data for a service campaign running on a service provider network. The network device may receive a customer authorization to share the customer data with an agent of the service provider network. The customer authorization may include session context information related to the presentation of the customer data. The network device may determine if there are predictive options for the customer data. When there are no predictive options for the real-time customer data, the network device may send, to the customer device, a first feed of the real-time customer data and may send, to the agent device, the session context information and a second feed of the real-time customer data. In one implementation, the session context information may enable the agent device to build an instance of the customer data that is similar to a presentation on the customer device, without sharing the customer screen view. In another implementation, the session context information may enable the agent device and customer device to use synchronized real-time data for automated exchanges, such as change negotiations, with or without actual presentation of the synchronized real-time data.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 9-10, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The word "exemplary" is used herein to mean "serving as an example." Any embodiment or implementation described as "exemplary" is not necessarily to be construed as preferred or advantageous over other embodiments or implementations.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    sending, by a network device and to a customer device, real-time customer data for a service campaign running via a service provider network;
    receiving, by the network device, a customer authorization to share the real-time customer data with an agent device for an agent of the service provider network, the customer authorization including session context information for characteristics of a network connection related to a presentation of the real-time customer data;
    determining, by the network device, whether there are predictive options for the real-time customer data;
    when there are no predictive options for the real-time customer data:
        sending, by the network device and to the customer device, a first feed of the real-time customer data, and sending, by the network device and to the agent device, the session context information and a second feed of the real-time customer data, the session context information enabling the agent device to build an instance of the real-time customer data that is similar to a presentation of the real-time customer data on the customer device; and when there are predictive options for the real-time customer data:
sending, by the network device and to the agent device, the first feed of the real-time customer data,
applying, by the network device and to the real-time customer data, predictive algorithms based on the session context information to compensate for a relative delay experienced by the customer device versus the agent device, wherein the applying generates predictive customer data, and
sending, by the network device and to the customer device, a feed of the predictive customer data based on the session context information, wherein the predictive customer data corresponds to the relative delay between the customer device and the agent device.

2. The method of claim 1, further comprising:
compensating for, in the predictive customer data, a communication lag for a corresponding telephone communication between a first user of the customer device and a second user of the agent device.

3. The method of claim 1, further comprising:
receiving, by the network device and from the customer device, a request for real-time customer data for the service campaign; and
retrieving, by the network device, the real-time customer data.

4. The method of claim 1, further comprising:
receiving, by the network device and from the agent device, connection speed information for a connection between the agent device and the network device.

5. The method of claim 1, further comprising:
receiving, by the network device and from the agent device, a proposed change to configuration settings for the service campaign;
generating, by the network device, simulated customer data based on the proposed change to the configuration settings;
sending, by the network device and to the customer device, a first feed of the simulated customer data; and
sending, by the network device and to the agent device, a second feed of the simulated customer data.

6. The method of claim 5, further comprising:
receiving, by the network device and from the customer device, an approval of the proposed change to the configuration settings; and
applying, by the network device, the proposed change to the configuration settings for the service campaign based on the approval.

7. The method of claim 1, wherein the session context information includes one or more of:
connection speed,
a minimum bandwidth, and
a number of hops between the customer device and the network device.

8. The method of claim 7, wherein the session context information includes one or more of:
a type of the customer device, and
a software type used to view the real-time customer data on the customer device.

9. The method of claim 1, further comprising:
receiving, by the network device and from the customer device, a proposed change to configuration settings for the service campaign;
validating, by the network device, feasibility of the proposed change in the service provider network;
generating, by the network device, simulated customer data based on the proposed change to the configuration settings;
sending, by the network device and to the customer device, a first feed of the simulated customer data; and
sending, by the network device and to the agent device, a second feed of the simulated customer data.

10. The method of claim 9, wherein the validating further comprises:
determining if the proposed change is supported by resources and policies of the service provider network, or
arbitrating the proposed changes among proposed changes from other customers of the service provider network.

11. The method of claim 1, further comprising:
providing, by the network device, the predictive data to synchronize display of the first feed of the simulated customer data on the customer device with display of the second feed of the simulated customer data on the agent device; or
providing, by the network device, time delay information to synchronize display of the second feed of the simulated customer data on the agent device with display of the first feed of the simulated customer data on the customer device.

12. A device, comprising:
a memory configured to store a plurality of instructions; and
a processor configured to execute the plurality of instructions to:
send, to a customer device, real-time customer data for a service campaign running via a service provider network;
receive a customer authorization to share the real-time customer data with an agent device for an agent of the service provider network, the customer authorization including session context information for characteristics of a network connection related to a presentation of the real-time customer data;
determine whether there are predictive options for the real-time customer data;
send, to the customer device, a first feed of the real-time customer data when there are no predictive options for the real-time customer data;
send, to the agent device, the session context information and a second feed of the real-time customer data when there are no predictive options for the real-time customer data, the session context information enabling the agent device to build an instance of the real-time customer data that is similar to the presentation of the real-time customer data on the customer device;
send, to the agent device, the first feed of the real-time customer data when there are predictive options for the real-time customer data;
apply, to the real-time customer data, predictive algorithms based on the session context information to compensate for a relative delay experienced by the customer device versus the agent device when there are predictive options for the real-time customer data, wherein the applying generates predictive customer data; and send, to the customer device, a feed of the predictive customer data based on the session context information when there are predictive options for the real-time customer data, wherein the predictive customer data corresponds to the relative delay between the customer device and the agent device.

13. The device of claim 12, wherein the processor is further configured to:

compensate for, in the predictive customer data, a communication lag for a corresponding telephone communication between a first user of the customer device and a second user of the agent device.

14. The device of claim 12, wherein the processor is further configured to:

receive from the customer device, a request for real-time customer data for the service campaign; and retrieve the real-time customer data.

15. The device of claim 12, wherein the processor is further configured to:

receive, from the agent device, a proposed change to configuration settings for the service campaign;

generate simulated customer data based on the proposed change to the configuration settings;

send, to the customer device, a first feed of the simulated customer data;

send, to the agent device, a second feed of the simulated customer data;

receive, from the customer device, an approval of the proposed change to the configuration settings; and apply the proposed change to the configuration settings for the service campaign based on the approval.

16. The device of claim 12, wherein the processor is further configured to:

receive, from the customer device, a proposed change to configuration settings for the service campaign;

validate feasibility of the proposed change in the service provider network;

generate simulated customer data based on the proposed change to the configuration settings;

send, to the customer device, a first feed of the simulated customer data; and send, to the agent device, a second feed of the simulated customer data.

17. The device of claim 16, wherein, when validating the feasibility of the proposed change to the configuration settings, the processor is further configured to:

arbitrate the proposed changes among proposed changes from other customers of the service provider network.

18. A non-transitory computer-readable medium containing instructions executable by at least one processing unit, the computer-readable medium comprising one or more instructions to:

send, to a customer device, real-time customer data for a service campaign running via a service provider network;

receive a customer authorization to share the real-time customer data with an agent device for an agent of the service provider network, the customer authorization including session context information related to a presentation of the real-time customer data;

determine whether there are predictive options for the real-time customer data;

send, to the customer device, a first feed of the real-time customer data when there are no predictive options for the real-time customer data;

send, to the agent device, the session context information and a second feed of the real-time customer data when there are no predictive options for the real-time customer data, the session context information enabling the agent device to build an instance of the real-time customer data that is similar to a presentation of the real-time customer data on the customer device;

send, to the agent device, the first feed of the real-time customer data when there are predictive options for the real-time customer data;

apply, to the real-time customer data, predictive algorithms based on the session context information to compensate for a relative delay experienced by the customer device versus the agent device when there are predictive options for the real-time customer data, wherein the applying generates predictive customer data; and send, to the customer device, a feed of the predictive customer data based on the session context information when there are predictive options for the real-time customer data, wherein the predictive customer data corresponds to the relative delay between the customer device and the agent device.

19. The non-transitory computer-readable medium claim 18, further comprising one or more instructions to:

receive, from the agent device, a proposed change to configuration settings for the service campaign;

generate simulated customer data based on the proposed change to the configuration settings;

send, to the customer device, a first feed of the simulated customer data;

send, to the agent device, a second feed of the simulated customer data;

receive, from the customer device, an approval of the proposed change to the configuration settings; and apply the proposed change to the configuration settings for the service campaign based on the approval.

20. The non-transitory computer-readable medium claim 19, further comprising one or more instructions to:

receive, from the customer device, a proposed change to configuration settings for the service campaign;

validate feasibility of the proposed change in the service provider network;

generate simulated customer data based on the proposed change to the configuration settings;

send, to the customer device, a first feed of the simulated customer data; and send, to the agent device, a second feed of the simulated customer data.

* * * * *